United States Patent [19]

Nagase

[11] Patent Number: 5,473,487
[45] Date of Patent: Dec. 5, 1995

[54] MAGNETIC HEAD GIMBAL SEAT DAMPED AGAINST UNWANTED OSCILLATION AND RESONANCE

[75] Inventor: Fumio Nagase, Mitaka, Japan

[73] Assignee: TEAC Corporation, Tokyo, Japan

[21] Appl. No.: 243,298

[22] Filed: May 17, 1994

[30] Foreign Application Priority Data

May 21, 1993 [JP] Japan ................................. 5-143014

[51] Int. Cl.$^6$ ............................. G11B 17/32; G11B 21/20
[52] U.S. Cl. ............................................................. 360/104
[58] Field of Search ...................... 360/104, 102, 360/103, 109; 359/554; 267/219; 318/649; 369/13, 44.15, 44.16, 44.17, 44.18, 44.19, 244, 246, 247, 248; 416/134 A, 140, 148; 74/574, 5.5; 440/57

[56] References Cited

U.S. PATENT DOCUMENTS

| | | | |
|---|---|---|---|
| 4,389,688 | 6/1983 | Higashiyama | 360/104 |
| 4,602,306 | 7/1986 | Noda | 360/99 |
| 4,625,249 | 11/1986 | Iwata | 360/104 |
| 4,709,285 | 11/1987 | Enami et al. | 360/104 |
| 4,841,396 | 6/1989 | Kawasaki | 360/104 |
| 4,876,623 | 10/1989 | Takekado | 360/104 |
| 5,003,419 | 3/1991 | Takekado | 360/104 |
| 5,027,238 | 6/1991 | Konishi et al. | 360/104 |

FOREIGN PATENT DOCUMENTS

| | | | |
|---|---|---|---|
| 59-151362 | 8/1984 | Japan | 360/104 |
| 60-45986 | 3/1985 | Japan | 360/104 |
| 62-65263 | 3/1987 | Japan | 360/104 |
| 63-302483 | 12/1988 | Japan . | |
| 1-245476 | 9/1989 | Japan | 360/104 |
| 2-143945 | 6/1990 | Japan . | |
| 5-198075 | 8/1993 | Japan | 360/104 |

*Primary Examiner*—Stuart S. Levy
*Assistant Examiner*—David L. Ometz
*Attorney, Agent, or Firm*—Woodcock Washburn Kurtz Mackiewicz & Norris

[57] ABSTRACT

A flexure seat for gimbaling a magnetic head is fabricated from sheet steel, comprising a central portion to which the head is to be mounted, an intermediate portion of annular shape around the central portion, and an outer portion of semiannular shape around the intermediate portion. The central portion is joined to the intermediate portion via a first pair of bridge portions in a first direction, and the intermediate portion to the outer portion via a second pair of bridge portions aligned in a second direction at right angles with the first direction. In order to suppress the unwanted oscillation, and prevent the resonance, of the central portion, a pair of dampers, as of silicone elastomer, are formed across the spacing between the central and intermediate portions, in positions on both sides of the central portion and in alignment with the second pair of bridge portions. The damper material is applied in fluid form and solidified by exposure to light. Any excessive spreading of the damper material before solidification is prevented by providing a pair of tapering tongues projecting from at least either of the central portion and the intermediate portion toward, and terminating short of, the other.

6 Claims, 3 Drawing Sheets

MAGNETIC HEAD GIMBAL SEAT DAMPED AGAINST UNWANTED OSCILLATION AND RESONANCE

BACKGROUND OF THE INVENTION

This invention relates to an apparatus having a pair of data s transducers for data transfer with a rotating, double sided flexible disk, typically a magnetic disk. More specifically, the invention pertains to improvements concerning a flexure seat supporting one of the data transducers in a gimbal fashion.

In a disk drive for use with a double sided flexible magnetic a disk, the pair of transducers are both mounted on flexure seats for optimum data transfer contact with the disk. Both transducers may be gimps baled, as disclosed in U.S. Pat. No. 4,602,306 to Noda, or only one of them gimbaled, as taught by U.S. Pat. No. 4,709,285 to Enami et al., both patents being assigned to the assignee of the instant application.

A typical flexure seat for gimbaling a transducer takes the form of a punching of resilient sheet metal. It is formed to include a central portion on which the transducer is seated, an annular intermediate portion surrounding the central portion, and an annular or semiannular outer portion surrounding the intermediate portion. The central portion is joined to the intermediate portion via a first pair of aligned bridge portions, and the intermediate portion to the outer portion via a second pair of aligned bridge portions angularly displaced 90 degrees from the first pair of bridge portions.

Although this known flexure seat configuration is well calculated to accomplish the purposes for which it is intended, it has proved that in some instances, the central portion of the seat is inconveniently more susceptible to oscillation about the first pair of bridge portions than about the second. The central portion of the seat has also proved to be rather easy to suffer undesired vibration by resonance as the disk rotates in sliding contact therewith.

In order to defeat these drawbacks, it has been contemplated to form a pair of bodies or films of damper material in limited regions spanning the spacings between the central and intermediate portions and aligned with the second pair of bridge portions. The most practical way of forming such damper bodies is to coat the damper material, such as silicone elastomer, on the required regions in fluid form and then to cause the coatings to solidify as by exposure to light.

Difficulties have been encountered in thus forming the damper bodies on the gimbal seat of the above conventional design. If applied in amounts required to form layers of desired thickness, the damper material spreads beyond the desired regions before solidifying. However, if the amounts are reduced to confine the material within the required regions, the resulting layers become too thin to perform the purposes for which they are intended.

SUMMARY OF THE INVENTION

The present invention provides a solution to the problem of how to damp the gimbal seat or seats of double sided disk drives without the noted difficulties and without adding any external parts to the seat or seats other than the damper material.

Stated in brief, the invention concerns a flexure seat for gimbaling a data transducer in rotating disk data storage apparatus. The flexure seat is per se formed from resilient sheet material to include a central portion on which the transducer is seated, an intermediate portion surrounding the central portion and joined thereto via a first pair of bridge portions disposed on opposite sides of the central portion and aligned in a first direction, and an outer portion surrounding at least part of the intermediate portion and joined thereto via a second pair of bridge portions disposed on opposite sides of the intermediate portion and aligned in a second direction at right angles with the first direction. The invention particularly features a pair of tongues, typically of approximately rectangular or, preferably, trapezoid shape, projecting from at least either of the central portion and the intermediate portion toward, and terminating short of, the other. The pair of tongues are disposed on opposite sides of the central portion and substantially aligned with the second pair of bridge portions.

Such being the improved gimbal seat configuration according to the invention, a pair of dampers can be formed almost exactly in required regions covering the pair of tongues and neighboring parts of the central portion and of the intermediate portion across the spacing therebetween, by coating a desired damper material in fluid form for subsequent solidification. Applied in fluid form, the damper material tends to spread before solidifying but is effectively limited by the pair of parallel or nonparallel side edges of each tongue. A pair of dampers can thus be formed in desired regions and to a desired thickness on the seat. It should be appreciated that this objective is accomplished only by slightly modifying the shape of the flexure seat.

The above and other features and advantages of this invention and the manner of realizing them will become more apparent, and the invention itself will best be understood, from a study of the following description and appended claims, with reference had to the attached drawings showing some preferable embodiments of the invention.

DESCRIPTION OF THE PREFERRED EMBODIMENTS

Figure 1:
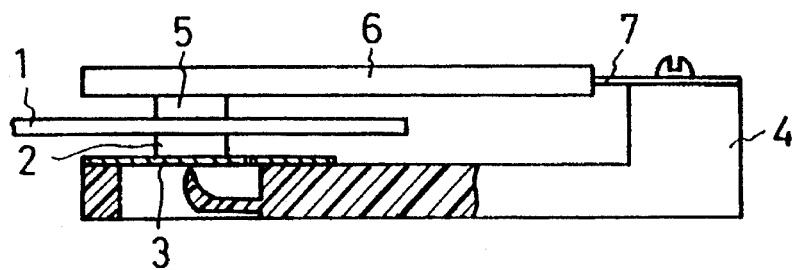
FIG. 1 is an elevational view, partly sectioned for clarity, of those parts of a double sided disk drive which bear more or less direct pertinence to the invention.

The present invention broadly concerns a disk drive for use with a double sided flexible magnetic disk. As illustrated in FIG. 1, such a disk drive has two transducers or magnetic heads 2 and 5 for data transfer with the opposite sides of a flexible magnetic disk 1. The head 2 is gimbaled on a flexure seat 3 which in turn is mounted to a carriage 4. The other head 5 is gimbaled on another flexure seat, not seen, which is mounted to a load arm 6. Mounted on the carriage 4 via a cantilever spring 7, the load arm 6 is pivotable toward and away from the disk 1 for loading both heads 2 and 5 against, and unloading them from, the disk. The disk drive as so far described is conventional except for the improved configuration of the flexure seat 3 to which the invention is specifically directed.

Figure 2A:
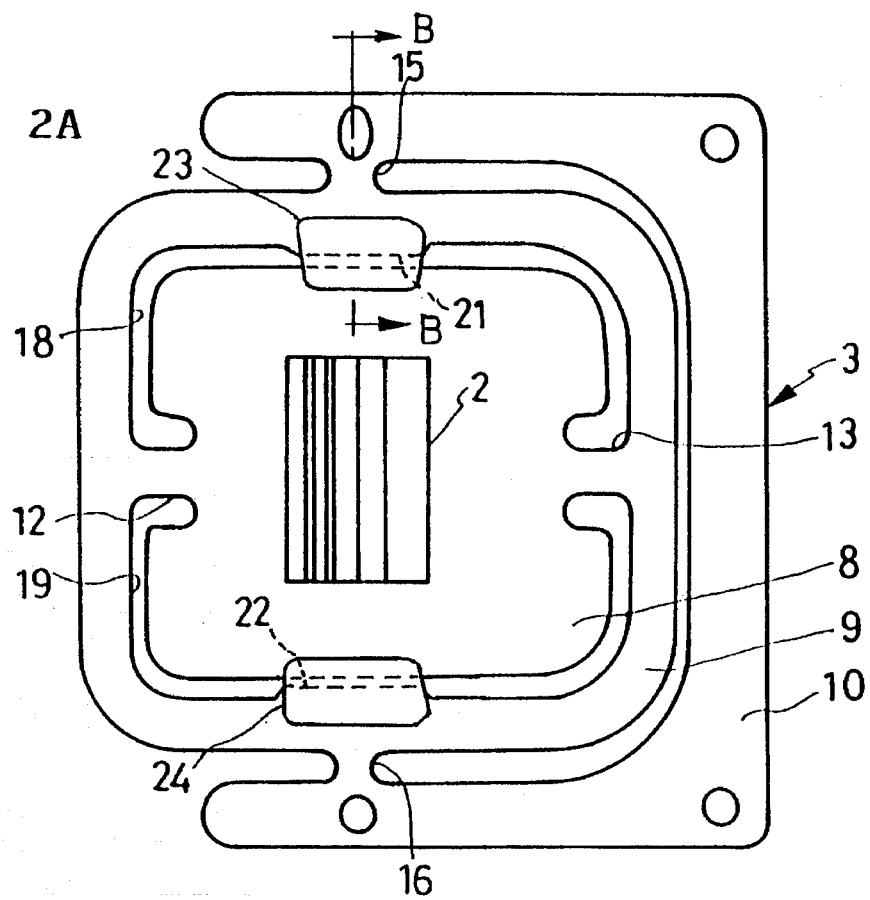
FIG. 2A is an enlarged plan view of an improved flexure seat according to the invention, shown together with a transducer mounted in position thereon and with a pair of dampers formed in positions thereon, for use in the disk drive of FIG. 1.
Figure 2B:
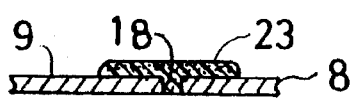
FIG. 2B is a section taken along the line B—B in FIG. 2A.

FIGS. 2A and 2B show in detail the flexure seat 3 together with the head 2 and a pair of dampers 23 and 24 thereon. The configuration of the flexure seat 3, however, will be better understood by referring to FIG. 3 which shows the flexure seat minus the head and the dampers.

Formed by punching resilient sheet metal such as stainless steel, the flexure seat 3 comprises a central portion 8 of approximately square shape, an intermediate portion 9 of approximately annular shape surrounding the central portion, and an outer portion 10 of approximately semiannular shape surrounding the intermediate portion. The central portion 8 is joined to the intermediate portion 9 via a pair of bridge portions 12 and 13 which are disposed on opposite sides of the central portion and which are aligned about on a first notional line 11. A pair of U shaped spacings 18 and 19 are thus left between central portion 8 and intermediate portion 9. The intermediate portion 9 is joined to the outer portion 10 via another pair of bridge portions 15 and 16 which are disposed on opposite sides of the intermediate portion and which are aligned about a second notional line 14 at right angles with the first notional line 11. A U shaped spacing 20 is thus left between intermediate portion 9 and outer portion 10. The outer portion 10 is shown to have four mounting holes 17 for use in fastening the flexure seat 3 to the carriage 4, FIG. 1.

As indicated in FIG. 2A, the head 2 is mounted centrally on the central portion 8 of the flexure seat 3. Thus, when the flexure seat 3 is mounted to the carriage 4 by fastener elements, not shown, extending through the mounting holes 17 in the flexure seat outer portion 10, the head 2 is pivotable in any direction about the two orthogonal axes extending through the two pairs of bridge portions.

FIGS. 2A and 2B also show the pair of dampers 23 and 24 formed on the flexure seat 3. These dampers are intended to mitigate the oscillation of the central portion 8 about the pair of bridge portions 12 and 13 and to suppress the resonant vibration of the flexure seat 3. The pair of dampers 23 and 24 are formed by coating a suitable material, preferably a photosetting polymer such as silicone elastomer, on predetermined regions, one indicated by the dashed outline and designated 22a in FIG. 4, across the spacings 18 and 19 between central portion 8 and intermediate portion 9 and by causing the coatings to solidify as by exposure to light. The present invention specifically concerns how to confine the coatings, which are fluid before exposure to light or other agent, within desired regions of FIG. 2A which can be somewhat larger than the predetermined coating regions 22a, as set forth in detail hereafter.

Figure 3:
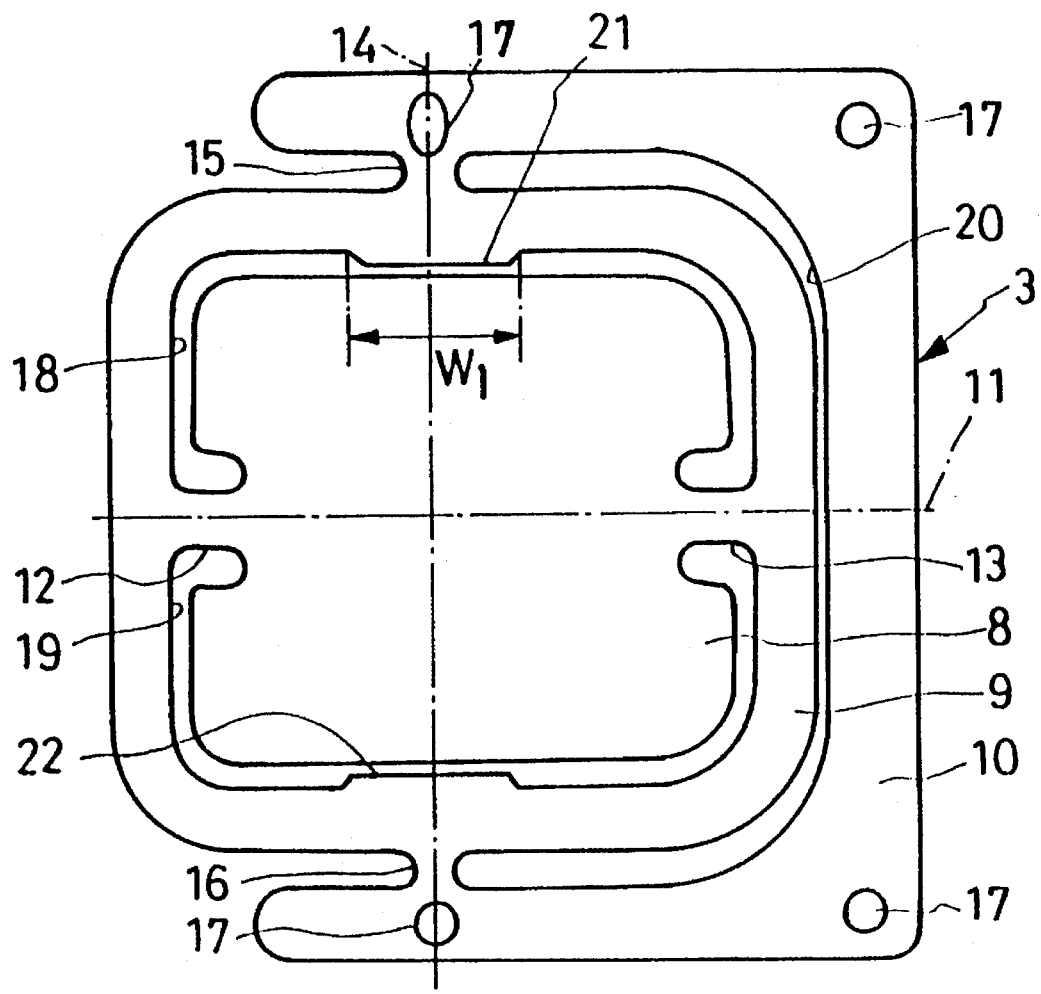
FIG. 3 is a view similar to FIG. 2A except that the transducer and the dampers are not shown.

As best seen in FIG. 3, a pair of tongues 21 and 22 of rectangular or, preferably, trapezoid shape project from the intermediate portion 9 toward, and terminate short of, the central portion 8. Disposed on opposite sides of the central portion 8, the tongues 21 and 22 are aligned about the second notional line 14 and hence with the second pair of bridge portions 15 and 16.

Figure 4:
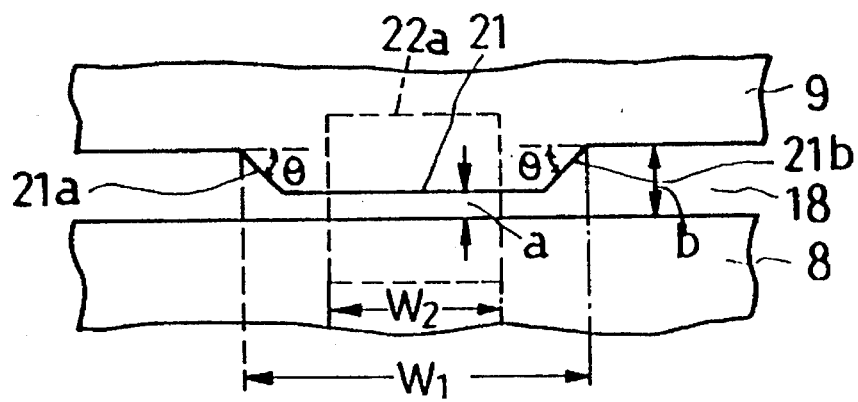
FIG. 4 is an enlarged, fragmentary plan view of one of the two parts of the FIG. 3 flexure seat where a damper is to be formed.

As illustrated on an enlarged scale in FIG. 4, each tongue 21 or 22 tapers as it extends from the intermediate toward the central portion, having a pair of side edges 21a and 21b at an angle θ of 20 to 80 degrees, preferably approximately 45 degrees, with respect to the edge of the intermediate portion 9 from which the tongue projects. For the best results the width a of the reduced spacing between each tongue and the central portion may be approximately half the width b of the spacing 18 or 19 between central portion and intermediate portion. Thus the width a may be from 0.1 to about 0.2 millimeter if the width b is from about 0.2 to about 0.4 millimeter. The total dimension $W_1$ of each tongue should be longer than the dimension $W_2$ of the coating region 22a.

Such being the improved configuration of the flexure seat 3 according to the invention, a desired damper material such as silicone elastomer may be coated in fluid form on the predetermined regions 22a. The initial fluidity or viscosity of the damper material should be such that it will not fall through the spacings between central portion 8 and intermediate portion 9. The spreading of the coatings before solidification, in the direction of the spacings 18 and 19, will be limited by the nonparallel side edges 21a and 21b of the tongues 21 and 22. Ultimately, the coatings will spread only to the desired regions 23 and 24 indicated by the hatching in FIG. 2A. Then the coatings may be solidified as by exposure to light. The preferred trapezoid shape of the tongues 21 and 22 will make the resulting dampers 23 and 24 larger on the intermediate portion 9 inclusive of the tongues 21 and 22 than on the central portion 8 for firmly anchoring the dampers to the intermediate portion and effectively damping the undesired oscillation of the central portion 8.

Figure 5:
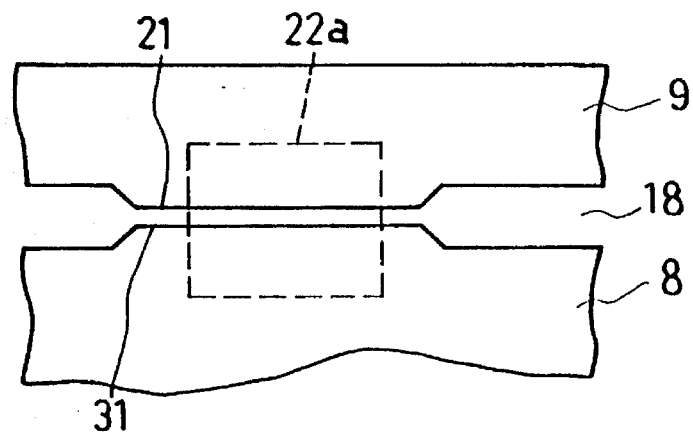
FIG. 5 is a view similar to FIG. 4 but showing another preferred form of flexure seat according to the invention.

In another preferred embodiment of the invention shown in FIG. 5, an additional pair of tongues, one shown at 31, extend from the central portion 8 toward the pair of tongues, one shown at 21, extending from the intermediate portion 9, leaving a reduced spacing between each opposed pair of tongues. A damper material is to be coated at 22a across the reduced spacing between each opposed pair of tongues.

Figure 6:
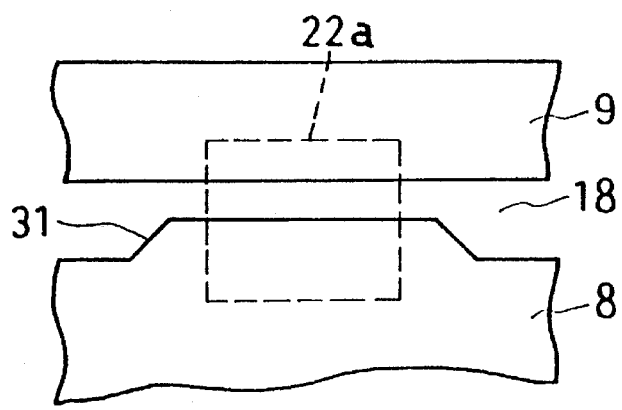
FIG. 6 is also a view similar to FIG. 4 but showing still another preferred form of flexure seat according to the invention.

FIG. 6 shows still another preferred embodiment in which a pair of tongues, one shown at 31, extend only from the central 8 toward, and terminate short of, the intermediate portion 9. A damper material is to be coated at 22a across the reduced spacing between each tongue 31 and the opposed straight edge of the intermediate portion.

Figure 7:
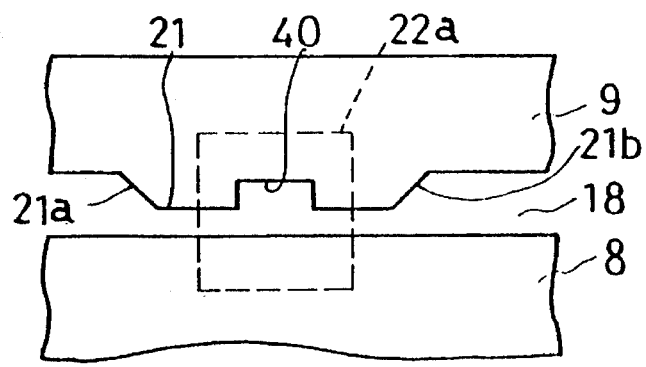
FIG. 7 is also a view similar to FIG. 4 but showing yet another preferred form of flexure seat according to the invention.

In FIG. 7 is shown a further preferred embodiment in which a recess 40 is formed in each pair of tongues, one shown at 21, extending from the intermediate portion 9 toward the central portion 8 as in the embodiment of FIGS. 1–4. A damper material is to be coated at 22a covering the recess 40.

Additional embodiments of the invention, as well as modifications and alterations of the illustrated embodiments, will readily suggest themselves to one skilled in the art without departing from the scope of the invention. For example, the outer portion of the flexure seat could be made annular in shape, instead of semiannular as in the illustrated embodiments in shape, completely surrounding the intermediate portion, and additional dampers could be formed according to the teachings of this invention. Also, the flexure seat supporting the head 5 on the load arm 6 could be configured and damped just like the flexure seat 3 supporting the head 2 on the carriage 4.

What is claimed is:

1. A flexible seat for supporting a data transducer in a gimbal fashion in a rotating disk data storage apparatus, the flexure seat comprising:
- (A) a piece of resilient sheet material comprising:
  - (a) a central portion to which a data transducer is to be mounted;
  - (b) an intermediate portion surrounding the central portion with a spacing therebetween;
  - (c) a first pair of bridge portions joining the central and the intermediate portions, the first pair of bridge portions being disposed on opposite sides of the central portion and aligned in a first direction;
  - (d) an outer portion surrounding at least part of the intermediate portion with a spacing therebetween;
  - (e) a second pair of bridge portions joining the intermediate and the outer portions, the second pair of bridge portions being disposed on opposite sides of the intermediate portion and aligned in a second direction at right angles with the first direction; and
  - (f) a pair of tongues projecting from at least one of the central portion and the intermediate portion toward, and terminating short of, the other, the pair of tongues being disposed on the opposite sides of the central portion and substantially in alignment with the second pair of bridge portions; and
- (B) a pair of dampers formed respectively on the pair of tongues and neighboring parts of the central portion and of the intermediate portion across the spacing therebetween in order to suppress oscillation and resonance of the central portion, the dampers being formed from a damper material that is applied in fluid form and that solidifies thereafter, the pair of tongues being effective to limit the spreading of the damper material before solidification.

2. The flexure seat of claim 1 wherein each of the pair of tongues is approximately rectangular in shape, having a pair of side edges which are particularly effective to limit the spreading of the damper material.

3. The flexure seat of claim 1 wherein each of the pair of tongues tapers as each tongue extends from one of the central portion and the intermediate portion toward the other, having a pair of nonparallel side edges which are particularly effective to limit the spreading of the damper material.

4. The flexure seat of claim 1 wherein a space left between each tongue and an opposed edge of one of the central portion and the intermediate portion has a width approximately half of the spacing between the central portion and the intermediate portion;

5. The flexure seat of claim 4 wherein the space between each tongue and the opposed edge of one of the central portion and the intermediate portion has a width of approximately 0.1 through 0.2 millimeter.

6. The flexure seat of claim 1 wherein each tongue has a recess formed therein.

* * * * *

UNITED STATES PATENT AND TRADEMARK OFFICE
CERTIFICATE OF CORRECTION

PATENT NO. : 5,473,487
DATED : December 5, 1995
INVENTOR(S) : Nagase

It is certified that error appears in the above-indentified patent and that said Letters Patent is hereby corrected as shown below:

Column 1, Line 14, after "magnetic" delete "a".

Column 1, Line 16, after "be" replace "gimps baled," with --gimbaled,--

Signed and Sealed this

Sixth Day of August, 1996

Attest:

BRUCE LEHMAN

*Attesting Officer*     *Commissioner of Patents and Trademarks*